(12) United States Patent
Kawabe et al.

(10) Patent No.: US 6,484,956 B2
(45) Date of Patent: Nov. 26, 2002

(54) SPINNING-REEL RECIPROCATING DEVICE

(75) Inventors: Yuzo Kawabe, Izumi (JP); Kenichi Sugawara, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/147,850

(22) Filed: May 20, 2002

(65) Prior Publication Data

US 2002/0134873 A1 Sep. 26, 2002

Related U.S. Application Data

(62) Division of application No. 09/853,776, filed on May 14, 2001, now Pat. No. 6,412,721.

(30) Foreign Application Priority Data

May 18, 2000 (JP) ........................................ 2000-145964

(51) Int. Cl.[7] .............................................. A01K 89/015
(52) U.S. Cl. ..................... 242/278; 242/242; 242/279
(58) Field of Search ................................ 242/278, 242, 242/279, 263, 277

(56) References Cited

U.S. PATENT DOCUMENTS 2,726,052 A    12/1955    Pons
3,055,607 A    9/1962     Schultz
5,232,181 A    8/1993     Fujine

FOREIGN PATENT DOCUMENTS

GB    645978    11/1950

Primary Examiner—Emmanuel Marcelo
(74) Attorney, Agent, or Firm—Shinjyu Global IP Counselors, LLP

(57) ABSTRACT

A dense-winding capable oscillating mechanism that holds down manufacturing costs and ensures easy manufacturing precision. The spinning reel oscillating mechanism (6), for reciprocating the spool back and forth in cooperation with rotation of the handle attached to the reel unit-to which a fishing-line-guiding rotor is rotatively fitted-includes a pinion gear (12), a stepped gear unit (13) and a shifting mechanism (17). The pinion gear (12) rotates in cooperation with handle rotation. The stepped gear unit (13) includes a larger-diameter gear (19) meshing with the pinion gear (12) and a smaller-diameter gear (20) disposed concentric with the larger-diameter gear (19), for rotating unitarily with the larger-diameter gear (19). The shifting mechanism (17) has a driven gear (16) meshing with the smaller-diameter gear (20) and reciprocates the spool by rotation of the driven gear (16).

14 Claims, 8 Drawing Sheets

SPINNING-REEL RECIPROCATING DEVICE

This is a division of U.S. application Ser. No. 09/853,776, filed on May 14, 2001, now U.S. Pat. No. 6,412,721, which claims the priority of Japanese Patent Application 145964, filed on May 18, 2000.

BACKGROUND OF THE INVENTION

1. Technical Field

The present invention relates to reciprocating devices, and in particular to spinning-reel reciprocating devices that pump the spool back and forth in cooperation with rotation of the handle.

2. Description of Related Art

Spinning-reel transverse-cam oscillating mechanisms (one example of a reciprocating device) include a driven gear meshing with a pinion gear, a threaded shaft, and a slider meshing with the threaded shaft. The threaded shaft is mounted to the front end of the driven gear and arranged in parallel with the spool shaft. The spool shaft is mounted to the slider and is axially immobile with respect to the slider.

In this transverse cam oscillating mechanism, the amount that the spool is shifted per rotation of the rotor depends on the lead angle of the threaded shaft. This means that the largeness of the inter-winding interval keeps the fishing line from winding on very efficiently.

JP H11-86A (1999) discloses an oscillating mechanism in which the amount that the spool is shifted back and forth per rotation of the handle is decreased, so that the fishing line can be wound densely onto the spool. The oscillating mechanism is provided with: a linking shaft disposed along an axis skew with the pinion gear so as to orient toward the threaded shaft; a screw gear fixed to, one end of the linking shaft and meshing with the pinion gear; a worm gear fixed to the other end of the linking shaft; and a worm wheel fitted non-rotatably to the threaded shaft and meshing with the worm gear. The linking shaft, linking the pinion gear and the threaded shaft, is arranged diagonally in the reel unit along an axis skew with the pinion gear to serve to make the reel unit thinner.

The above-noted conventional configuration utilizes the worm gear, and the worm wheel that meshes with the worm gear, for gearing-down in order to wind densely, meaning that special gears difficult to machine are used, which makes manufacturing costs high. Furthermore, because the linking shaft is disposed diagonally to link the pinion gear and the threaded gear, the linking shaft and the threaded shaft have to be established in different directions, and the bearings that support them also have to be established in the different directions. Establishing two types of bearings in the different directions makes guaranteeing machining precision difficult, elevating machining costs.

SUMMARY OF THE INVENTION

An object of the present invention is in holding down manufacturing costs and readily ensuring manufacturing precision in a reciprocating mechanism that enables dense winding.

According to a first aspect of the present invention, a spinning reel reciprocating device for shifting a spool back and forth when turning a handle attached to a reel unit of the spinning reel to which a rotor, onto which fishing line is guided, is mounted rotatively includes a drive gear, a stepped gear unit and a shifting means. The drive gear rotates when the handle is rotated. The stepped gear unit includes a larger-diameter gear meshing with the drive gear and a smaller-diameter gear arranged concentrically to the larger-diameter gear and rotating together with the larger-diameter gear. The shifting means, which has a driven gear meshing with the smaller-diameter gear, is for shifting the spool back and forth by rotating the driven gear.

In this reciprocating device, the drive gear rotates as a result of turning the handle. When the drive gear rotates, its rotation is transmitted to the larger-diameter gear of the stepped gear unit, and the smaller-diameter gear rotates together with the larger-diameter gear. When the smaller-diameter gear rotates, its rotation is transmitted to the driven gear, and the spool is shifted back and forth with the shifting means. Thus, rotation deceleration and the shifting of the spool is accomplished with a stepped gear unit of simple structure, so that it is not necessary to use any special gears, and the manufacturing costs can be kept down. The rotational axis of the stepped gear unit is arranged in parallel to the rotational axes of the drive gear and the driven gear, so that it is easy to ensure a high manufacturing precision.

According to a second aspect of the present invention, in a reciprocating device as in the first aspect, the drive gear is a pinion gear rotating around a spool shaft that can be shifted back and forth with respect to the reel unit, the spool being mounted to the tip of the spool shaft. The shifting means includes (i) a threaded shaft arranged in parallel to the spool shaft, the driven gear being attached non-rotatively to the threaded shaft, and intersecting helical grooves being formed in a surface of the threaded shaft, and (ii) a sliding element that can be shifted back and forth with respect to the reel unit, and has an engager engaging with the helical grooves. The spool shaft is mounted to the sliding element and cannot be shifted back and forth with respect to the sliding element. In this configuration, the rotational axis of the pinion gear, which is the drive gear and extends horizontally, as well as the rotational axis of the stepped gear unit, and the threaded shaft are arranged in parallel, so that the spinning reel can be made flat by arranging them vertically one above the other. Moreover, a compact vertical size can be achieved by arranging them horizontally next to one another.

According to a third aspect of the present invention, in a reciprocating device as in the first aspect, the rotor includes a barrel portion, and a pair of rotor arms extending frontward from a rear end of the barrel portion. The reel unit has a tubular portion extending into the barrel portion., and the stepped gear unit is arranged inside the tubular portion. With this configuration, the relatively large diameter stepped gear unit is arranged in the tubular portion extending into the barrel portion of the rotor, so that using space efficiently, the reel can be made flatter.

According to a fourth aspect of the present invention, in a reciprocating device as in the first aspect, the drive gear is provided on a main gear shaft mounted rotatively in the reel unit, and rotates together with the handle. The shifting means includes a cam pin protruding from a lateral face of the driven gear, and a sliding element that can be shifted back and forth with respect to the reel unit and has a cam groove engaging with the cam pin. The spool is attached to the front end of a spool shaft, which can be shifted back and forth with respect to the reel unit, and which is mounted to the sliding element with respect to which it cannot be shifted back and forth. With this configuration, the rotation is transmitted by three parallel rotational axes extending from left to right in the reel unit, so that the reel unit can be easily made thinner.

According to a fifth aspect of the present invention, in a reciprocating device as in any of the first to third aspects, the number of teeth on the drive gear is smaller than the number of teeth on the larger-diameter gear. This configuration achieves gearing-down between the shifting gear and the larger-diameter gear.

According to a sixth aspect of the present invention, in a reciprocating device as in the fifth aspect, the number of teeth on the driven gear is larger than the number of teeth on the smaller-diameter gear. With this configuration, deceleration between the driven gear and the smaller-diameter gear is achieved, and a large gear-down ratio is attained.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration and Configuration of the Reel Unit

Figure 1:
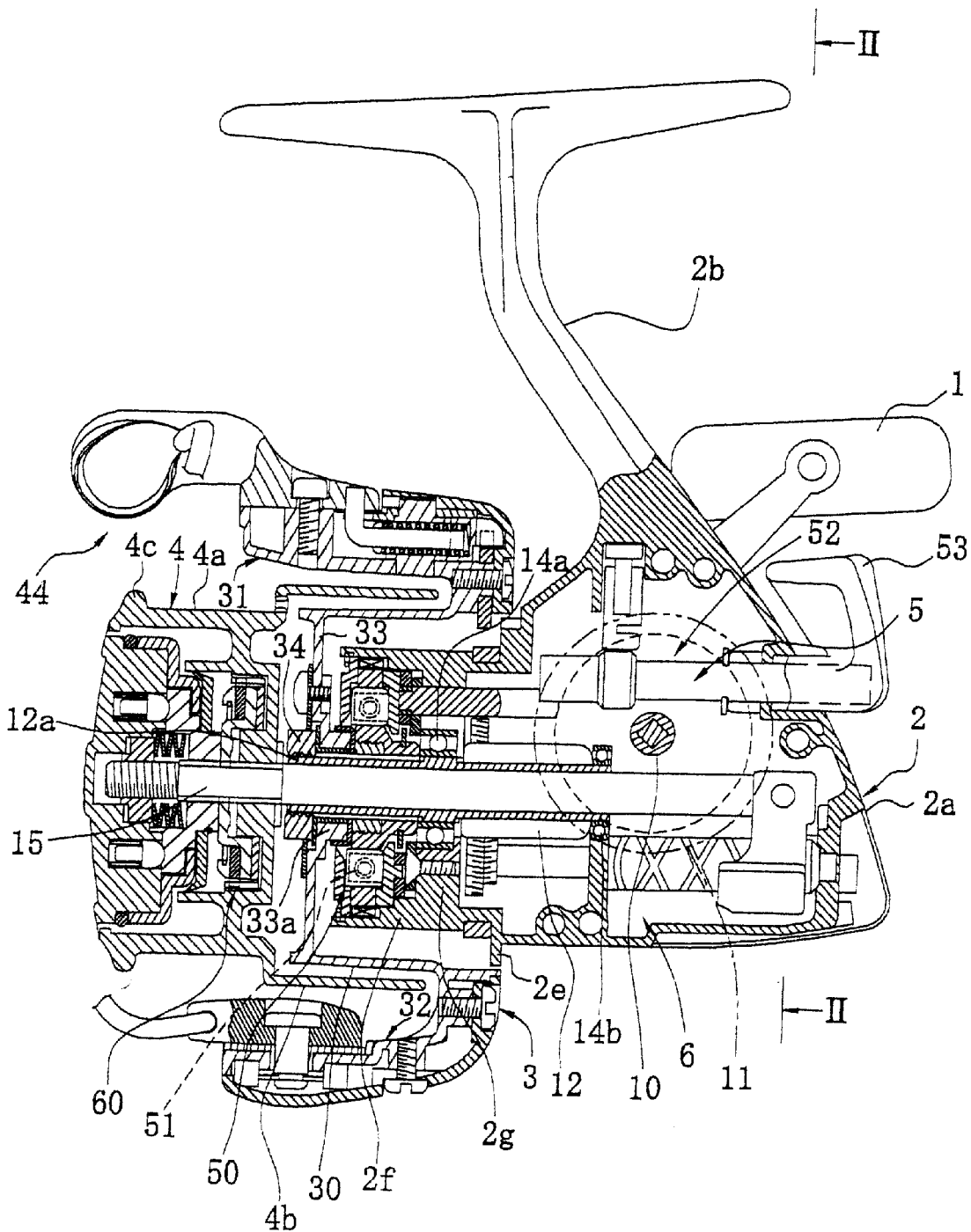
FIG. 1 is a cross-sectional view of a spinning reel in accordance with an embodiment of the present invention, taken from the left.

As shown in FIG. 1, a spinning reel in accordance with an embodiment of the present invention includes a reel unit 2, a rotor 3, a spool 4, and a handle 1 that is rotatively supported by the reel unit 2. The rotor 3 is rotatively supported at the front of the reel unit 2. Fishing line is wound around the outer peripheral surface of the spool 4, which is disposed to permit shifting back and forth on the front of the rotor 3.

Figure 2:
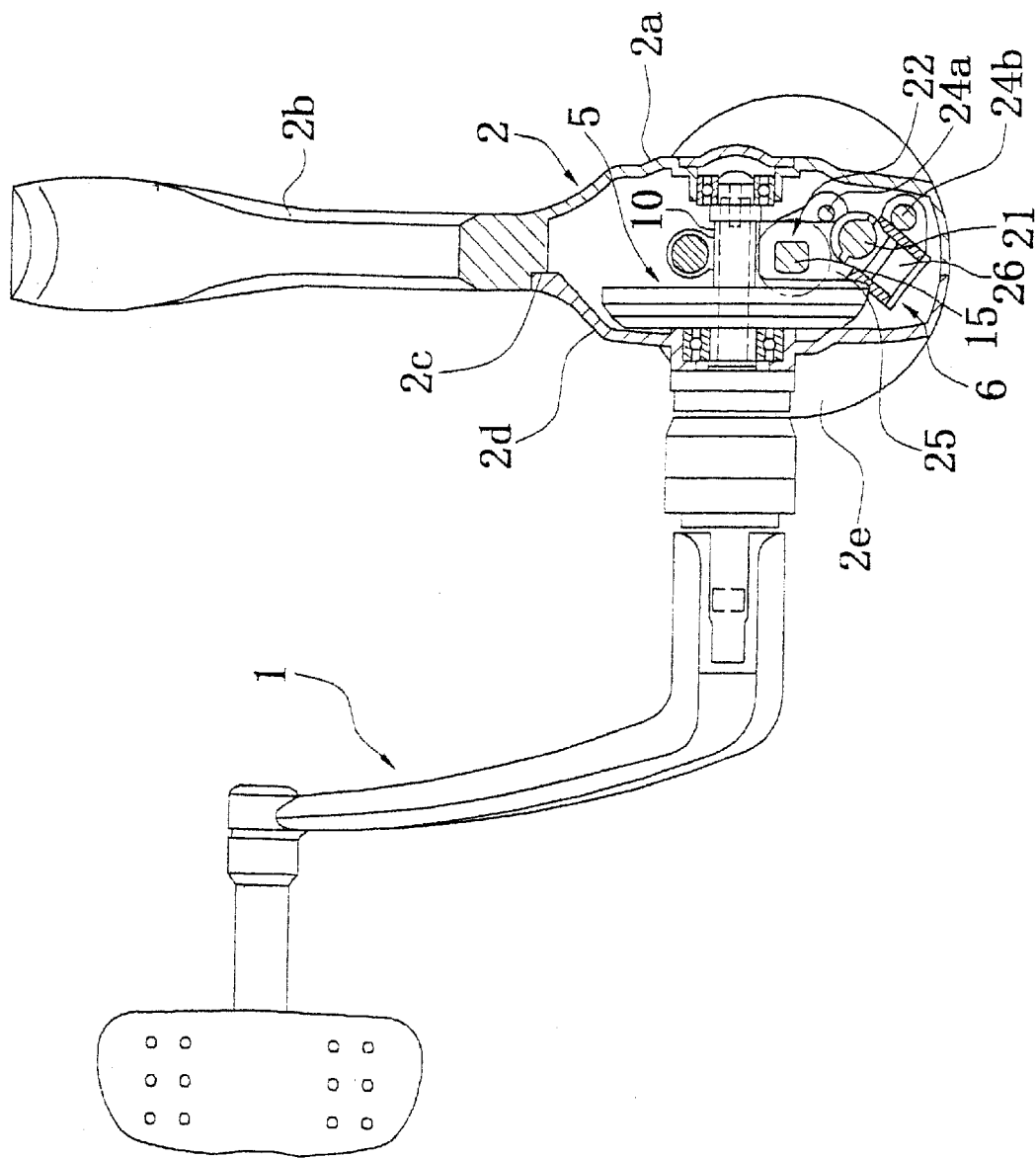
FIG. 2 is a cross-sectional view along the line II—II in FIG. 1.
Figure 3:
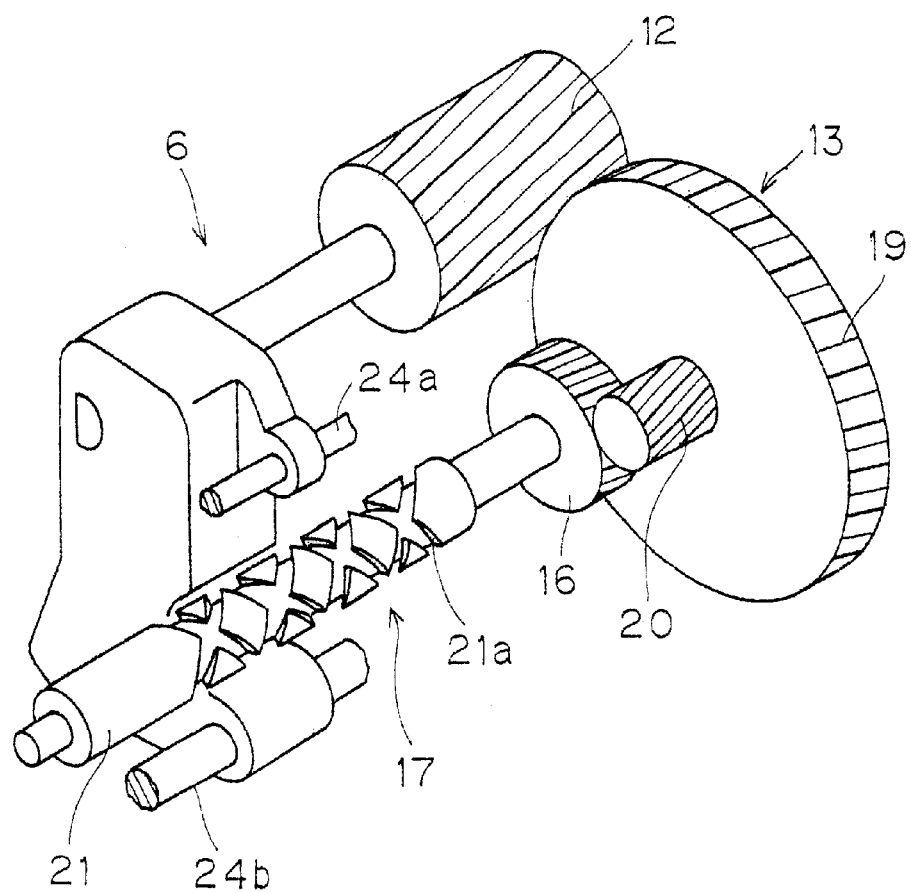
FIG. 3 is a perspective view of the oscillating mechanism.
Figure 4:
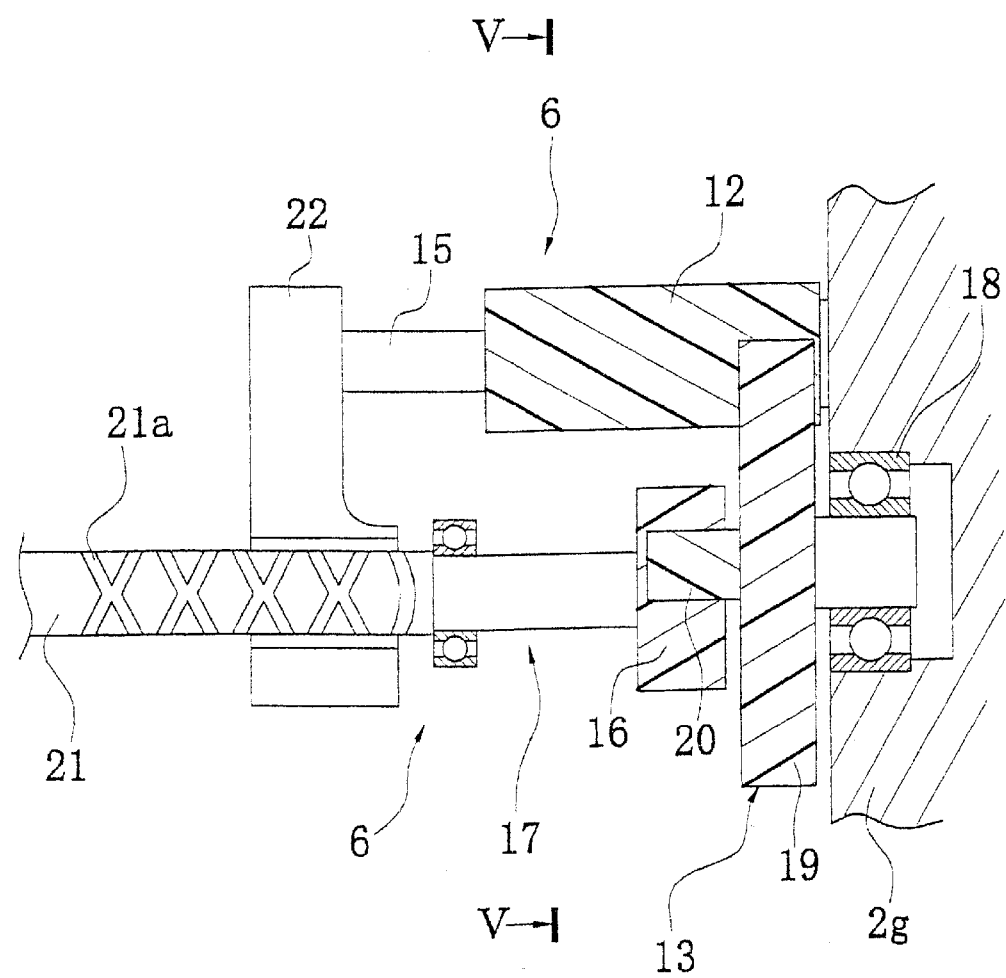
FIG. 4 is a partial longitudinal cross-sectional view of the oscillating mechanism.
Figure 5:
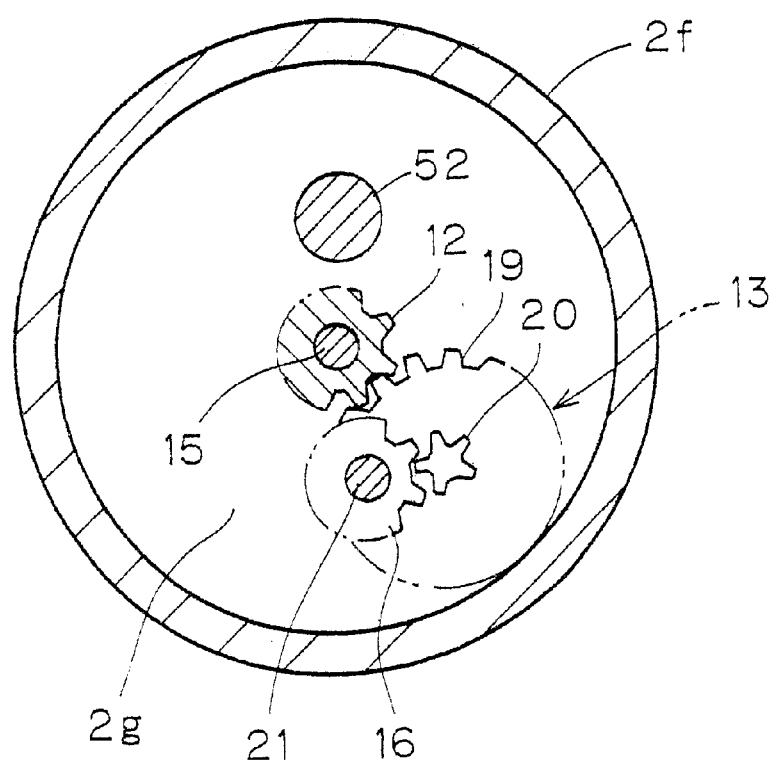
FIG. 5 is a cross-sectional view along the line V—V in FIG. 4.

As shown in FIGS. 1 and 2, the reel unit 2 includes a reel body 2a provided with an opening 2c on its side, a T-shaped rod attachment leg 2b extending diagonally upward to the front from the reel body 2a and formed unitarily therewith, and a lid 2d closing the opening 2c in the reel body 2a.

The reel body 2a has a space inside, which accommodates a rotor driving mechanism 5 and an oscillating mechanism 6. The rotor driving mechanism 5 transmits the rotation of the handle 1 to rotate the rotor 3. The oscillating mechanism 6 is for uniformly winding on fishing line by shifting the spool 4 back and forth.

At the front of the reel body 2a, a circular flange portion 2e is formed with the lid 2d covering the rear of the rotor 3. A tubular portion 2f protruding into the rotor 3 is formed at the front of the flange portion 2e. A partition wall 2g is formed inside the tubular portion 2f, and tubular spaces are formed on either side of the partition wall 2g.

Configuration of the Rotor

As shown in FIG. 1, the rotor 3 includes a barrel portion 30 the rear end of which is open, and first and second rotor arms 31 and 32, disposed in opposition to one another at the sides of the barrel portion 30. The barrel portion 30 and the two rotor arms 31 and 32 are formed unitarily.

The barrel portion 30 is disposed to the outer peripheral side of the tubular portion 2f of the reel body 2a. The open rear portion of the barrel portion 30 is covered by the flange portion 2e. A front wall 33 is formed on the front part of the barrel portion 30, and a boss portion 33a is formed in the center of the front wall 33. A front portion 12a of the pinion gear 12 and the spool shaft 15 are passed through a through-hole in the boss portion 33a. A nut 34 is disposed at the front of the front wall 33, and this nut 34 fastens the rotor 3 to the pinion gear 12 by screwing it to a threaded portion at the front end of the pinion gear 12.

A bail arm 44 for guiding the fishing line to the spool 4 is provided on the tips of the first and second rotor arms 31 and 32, pivotable between a line-winding position and a line-releasing position.

A reverse rotation check mechanism 50 for the rotor 3 is provided in the space in front of the partition wall 2g in the barrel portion 30 of the rotor 3. This reverse rotation check mechanism 50 has a roller-type one-way clutch 51 and an operating mechanism for switching the one-way clutch 51 between an operating state and a non-operating state. The one-way clutch 51 has an outer ring fastened to the reel body 2a and an inner ring mounted non-rotatively to the pinion gear 12. The operating mechanism 52 includes an operating lever 53 disposed on the rear of the reel body 2a. The one-way clutch 51 can be switched between its two positions by pivoting the operating lever 53. When the one-way clutch 51 is in the operating state, the rotor 3 cannot rotate in reverse, and when it is in the non-operating state, the rotor 3 can rotate in reverse.

Configuration of the Spool

The spool 4 is arranged between the first rotor arm 31 and the second rotor arm 32 of the rotor 3, and is fastened to the front end of the spool shaft 15 with the drag mechanism 60 interposed between the spool shaft 15 and the spool 4. The spool 4 includes a bobbin trunk portion 4a circumferentially around which fishing line is wound, a skirt portion 4b formed unitarily with the rear of the bobbin trunk portion 4a, and a flange portion 4c attached to the front of the bobbin trunk portion 4a. The bobbin trunk portion 4a is a cylindrical member extending to the outer peripheral side of the barrel portion 30 of the rotor 3. The skirt portion 4b and the front flange portion 4c extend radially outward perpendicularly from both sides of the bobbin trunk portion 4a. Thus, the number of windings per layer of fishing line is approximately the same when the fishing line is being wound around the bobbin trunk portion 4a of the spool 4.

Configuration of the Rotor Driving Mechanism

As shown in FIGS. 1 and 2, the rotor driving mechanism 5 includes a main gear shaft 10, a main gear 11 and a pinion gear 12. The main gear 11 rotates together with the main gear shaft 10, on which the handle 1 is mounted non-rotatively. The pinion gear 12 meshes with the main gear 11. The pinion gear 12, which is tubular and rotates when the handle is turned, is pierced by the horizontally extending spool shaft 15. The middle and the rear of the pinion gear 12 are supported rotatively with ball bearings 14a and 14b by the reel body 2a. The rotor 3 is mounted non-rotatively on the front end of the pinion gear 12.

Configuration of the Oscillating Mechanism

The oscillating mechanism 6 reciprocates the spool 3 back and forth via the spool shaft 15 when the handle 1 is turned. As shown in FIGS. 2 to 5, the oscillating mechanism 6 includes the pinion gear 12 serving as a drive gear, a stepped gear unit 13 meshing with the pinion gear 12, and a shifting mechanism 17 including a driven helical gear 16 meshing with the stepped gear unit 13.

The stepped gear unit 13 is provided for gearing-down the rotation of the pinion gear 12 and transmitting it to the driven gear 16. The stepped gear unit 13 is placed in the space behind the partition wall 2g of the tubular portion 2f. The stepped gear unit 13 is supported rotatively by the partition wall 2g on a bearing 18 (see FIG. 4). The stepped gear unit 13 includes two gears of different size, namely a larger-diameter gear 19 meshing with the pinion gear 12, and a smaller-diameter gear 20 formed unitarily with the large diameter gear 19 and meshing with the driven gear 16. The smaller-diameter gear 20 is a helical gear arranged concentrically with the larger-diameter gear 19.

Employing the stepped gear unit 13 having the two gears 19 and 20 in this way to gear down makes it possible to gear down and reciprocate the spool 4 slowly back and forth by means of a simple gear construction. This means that no special gears need be used, which keeps manufacturing costs from rising. The rotational axis of the stepped gear unit 13 is arranged in parallel to the rotational axes of the pinion gear 12 and the driven gear 16, so that it is easy to ensure a high manufacturing precision. Furthermore, the stepped gear unit 13 is arranged in the tubular portion 2f of the reel body 2a, so that it is not necessary to increase the lateral width of the reel body 2, even though deceleration is performed with the stepped gear unit 13 including the larger-diameter gear 19, which is relatively voluminous in the width direction (lateral direction). Thus, a compact reel can be accomplished.

The pinion gear 12 has eight teeth, and the larger-diameter gear 19 has sixteen teeth, for example. The smaller-diameter gear 20 has five teeth, and the driven gear 16 has fifteen teeth, for example. Thus, the gear-down ratio, which is ratio between the rotation speed of the screw axis 21 and the rotation speed of the pinion gear 12, is $(1/2) \times (5/15) = 1/6$. It is preferable that this gear-down ratio is in the range of $1/4$ to $1/24$. If the gear-down ratio is larger than $1/4$, then the shifting speed of the spool 4 becomes too large, and the desired effect of winding the fishing line densely around the spool 4 cannot be attained. If the gear-down ratio is smaller than $1/24$, then the shifting speed of the spool 4 is too slow, and even thin lines are wound twice per rotation of the rotor 3. It should be noted that the number of teeth in FIGS. 3 to 5 may not correspond exactly to the above explanations.

The shifting mechanism 17 includes a threaded shaft 21, a slider 22, and guide shafts 24a and 24b. The threaded shaft 21 is arranged below the spool shaft 15 and mounted to the front end of the driven gear 16. The slider 22 moves back and forth along the threaded shaft 21, guided by the two guide shafts 24a and 24b.

The threaded shaft 21 is arranged in parallel to the spool shaft 15, and is supported rotatively in the reel body 2a. Helical intersecting grooves 21a are formed in the outer peripheral portion of the threaded shaft 21. The lead angle θ of the grooves 21a is set to 20 to 45°. Here, the "lead angle θ" is the angle $$\theta = \text{arccot}(\pi D / L)$$

wherein D is the bottom diameter of the grooves 21a, and the lead L is the advance length in the axial direction per rotation of the threaded shaft 21. If this lead angle θ is smaller than 20°, the wall thickness between the grooves becomes thin, and the number of groove intersections increases, which is undesirable. On the other hand, if the lead angle θ is greater than 45°, the efficiency with which the rotational movement is converted into a linear movement decreases, which is also undesirable.

The slider 22 includes a main slider unit 25 and an engaging member 26 accommodated in the main slider unit 25. The main slider unit 25 is guided in parallel to the spool shaft 15 by the guide shafts 24a and 24b. The engaging member 26 is fitted rotatively within the main slider unit 25, and the front end of the engaging member 26 meshes with the grooves 21a in the threaded shaft 21.

Handling and Operating the Reel

When casting with this spinning reel, the bail arm 44 falls from the line-winding position to the line-releasing position. Then, the tackle is cast by swinging the rod. Thus, fishing line is released in a helical fashion from the front end of the spool 4. In this situation, the fishing line is wound densely around the spool 4, so that there is low releasing resistance.

When winding on fishing line, the bail arm 44 is tripped into line-winding position. This happens automatically due to the action of a cam and a spring (not shown in the drawings) when the handle 1 is turned in the line-winding direction. When the handle 1 is turned in the line-winding direction, its torque is transmitted via the main gear shaft 10 and the main gear 11 to the pinion gear 12. The torque transmitted to the pinion gear 12 is transmitted over the front portion 12a of the pinion gear 12 to the rotor 3, rotating the rotor 3 in the line-winding direction.

In addition, the stepped gear portion 13 is rotated by the larger-diameter gear 19 meshing with the pinion gear 12, and this rotation is transmitted to the driven gear 16 via the small-rotation gear 20. As a result, the threaded shaft 21 is rotated at $1/6$ of the rotation speed of the pinion gear 12 (rotation speed of the rotor 3). The rotation of the threaded shaft 21 causes the slider 22 meshing with the grooves 21a of the threaded shaft 21 to shift in the front-to-rear direction, guided by the guide shafts 24a and 24b. Then, the fishing line is guided onto the spool 4 by the bail arm 44 and wound densely around the bobbin trunk portion 4a of the spool 4. Thus, the fishing line can be wound with high efficiency onto the spool 4.

Figure 6:
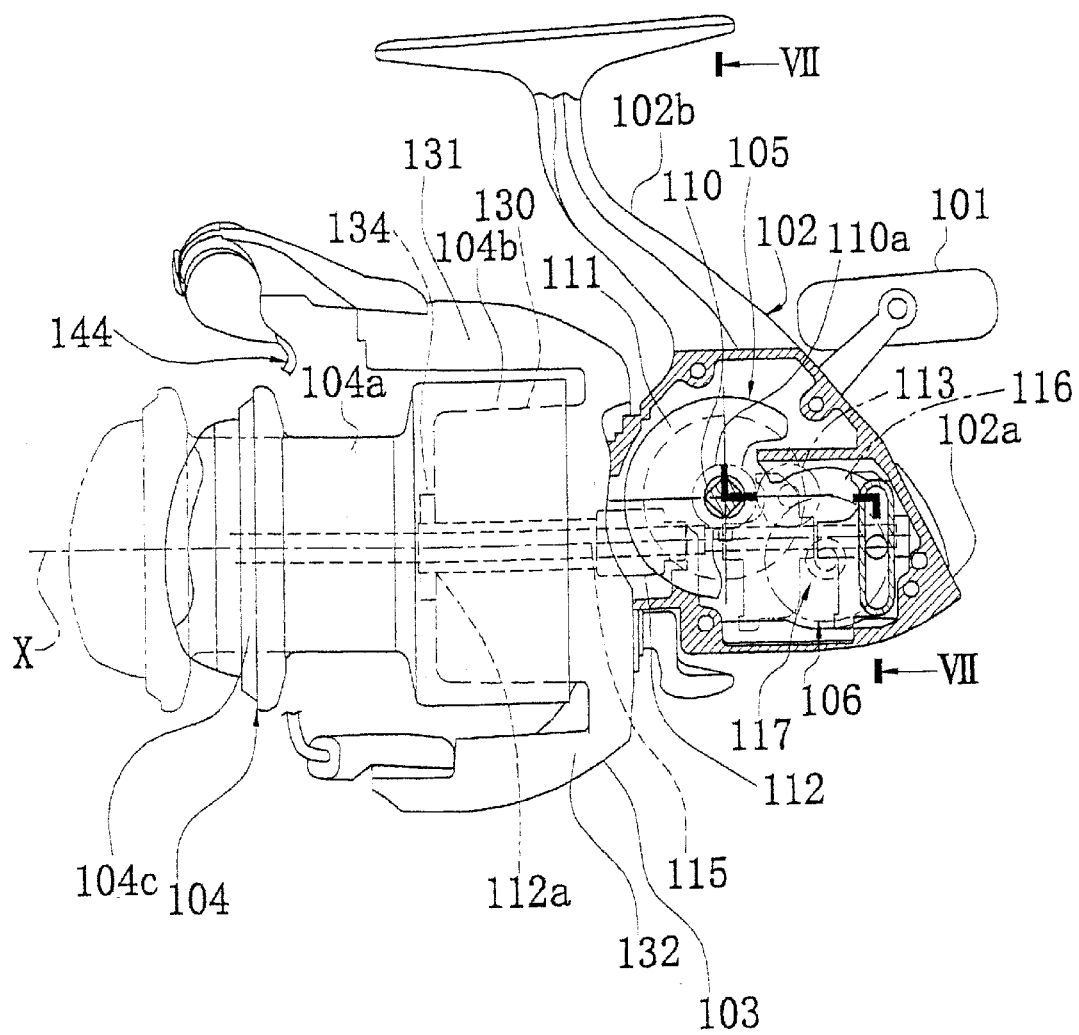
FIG. 6 is a cross-sectional view of a spinning reel in accordance with another embodiment of the present invention, taken from the left.
Figure 7:
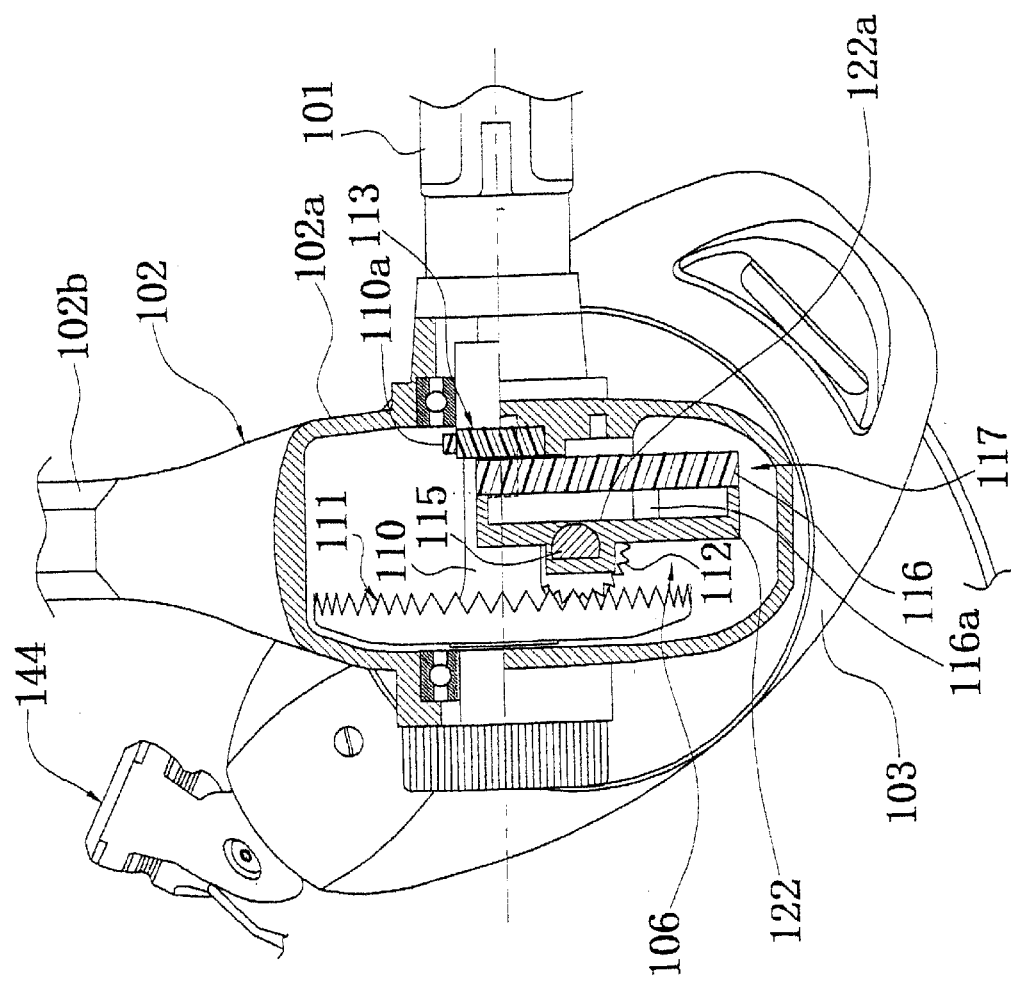
FIG. 7 is a cross-sectional view along the line VII—VII in FIG. 6.
Figure 8:
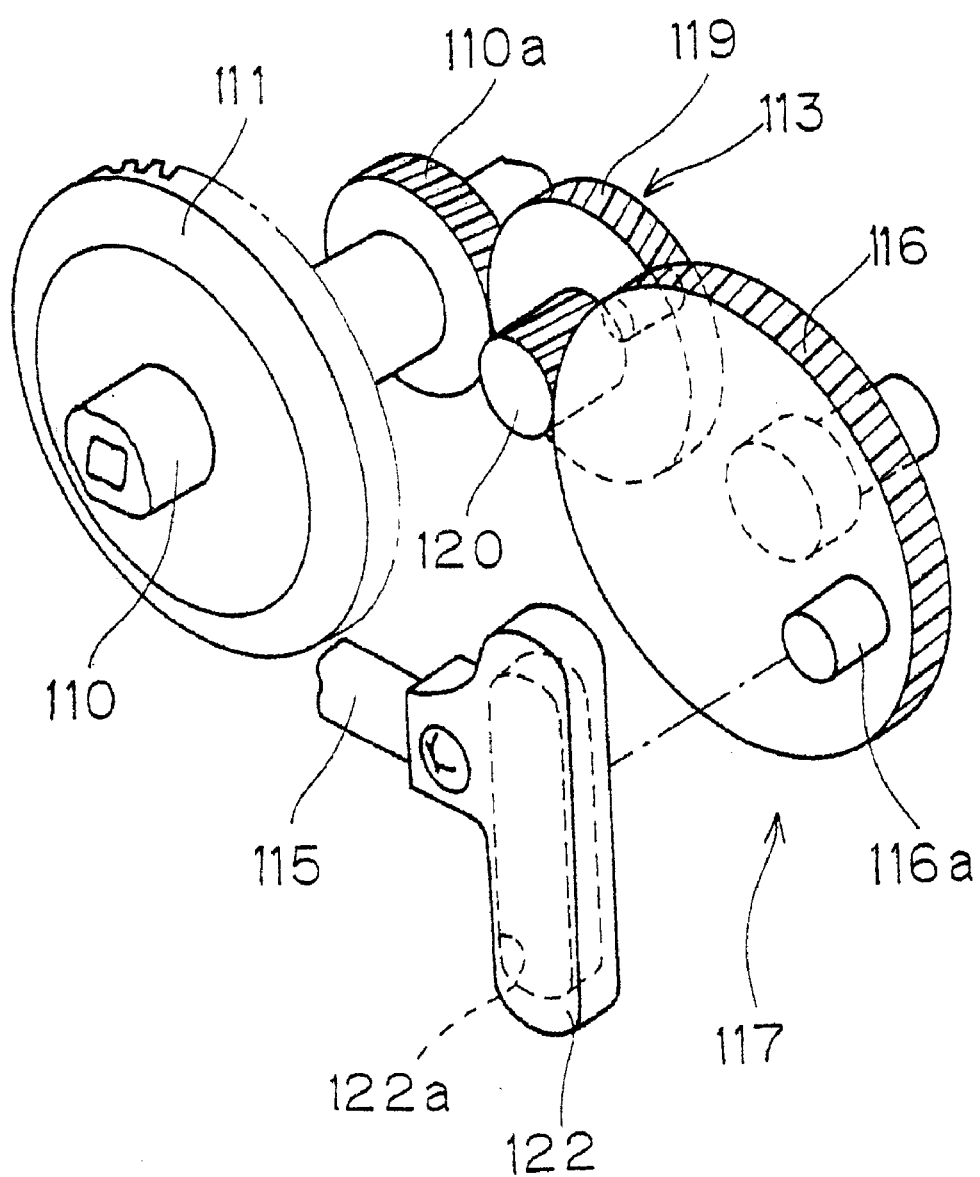
FIG. 8 is a perspective view of the oscillating mechanism in the other embodiment of the present invention.

Other Embodiments (a) The previous embodiment has been explained with an example of a traverse cam oscillating mechanism. However, as shown in FIGS. 6 to 8 the present invention can also be applied to a reduction gear oscillating mechanism. Here, elements that are identical and similar to those in the previous embodiment are denoted by like numerals plus 100. Also, except for the oscillating mechanism 106, explanations regarding structure and operation have been omitted.

As shown in FIGS. 6 to 8, the oscillating mechanism 106 includes a drive gear 110a formed on a main gear shaft 110 that is formed unitarily with the main gear 111, a stepped gear unit 113 meshing with the driven gear 110a, and a shifting mechanism 117 including a driven gear 116 meshing with the smaller-diameter gear 120 of the stepped gear unit 113.

The stepped gear unit 113 and the driven gear 116 are supported rotatively in the inner side of the rear wall of the reel body 102a. The stepped gear unit 113 and the driven gear 116 are arranged parallel to the main gear shaft 110. In this embodiment, the larger-diameter gear 119 of the stepped gear unit 113 meshes with the drive gear 110a, and the smaller-diameter gear 120 meshes with the driven gear 116.

The shifting mechanism 117 includes a driven gear 116 and a slider 122 disposed in oppoition to the driven gear 116. A cam pin 116a is formed on the lateral face of the driven gear 116, protruding toward the slider 122.

The slider 122 can be shifted back and forth in the reel body 102a. The slider 122 is fitted non-rotatively on the rear end of the spool shaft 115, and is not shiftable with respect to the spool shaft 115 in the axial direction. A vertical cam groove 122a is formed in the lateral face of the slider 122, in opposition to the driven gear 116. The cam pin 116a engages with this cam groove 122a. The length of the cam groove 122a is a little greater than the rotational diameter of the cam pin 116a.

Rotating the main gear shaft 110 in a reduction gear oscillating mechanism 106 with this configuration, the driven gear 116 is rotated via the stepped gear unit 113, and the cam pin 116a is rotated. When the cam pin 116a rotates, the slider 122 shifts back and forth since the cam pin 116a is engaged with the cam groove 122a, thus moving the spool 104 back and forth. Thus, with the stepped gear unit 113, it is possible to attain a large gear-down ratio with a simple configuration, and to keep the manufacturing costs down, due to this simple configuration for dense winding.

(b) The above embodiments have been described taking an example of a front drag spinning reel, but the present invention can also be applied to oscillating mechanisms in rear drag spinning reels, for example. In that case, the spool shaft is coupled rotatively and axially immovably to the slider. Moreover, the present invention can also be applied to lever brake type spinning reels and in-spool type spinning reels.

(c) In the above embodiments, the threaded shaft 21 is arranged below the spool shaft 15, but it can also be arranged sideways (laterally) or above it.

(d) In the above embodiments, the rotational axes of the smaller-diameter gear 20 of the stepped gear unit 13 and of the reduction gear 16 are configured as parallel helical gears, but they can also be configured so as to transmit a rotational movement between two intersecting or skew rotational axes. For example, the two gears can also be configured as bevel gears or crossed helical gears with a relatively simple structure.

Through the present invention, rotational gearing-down is accomplished with a stepped gear unit of simple structure to reciprocate the spool, making it unnecessary to use special gears, and holding down elevation in manufacturing costs. The rotational axis of the stepped gear unit is arranged in parallel to the rotational axes of the drive gear and the driven gear, so that it is easy to ensure a high manufacturing precision.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning reel reciprocating device for reciprocating a spool back and forth in cooperation with rotation of a handle furnished on a spinning-reel unit to which a fishing-line-guiding rotor is rotatively fitted, the rotation of the handle being transmitted to the rotor via a pinion gear, the spinning reel reciprocating device comprising:
   a main gear for rotating together with the rotation of the handle;
   a drive gear for rotating in cooperation with rotation of the handle, said drive gear being disposed on an opposite side from said main gear relative to the pinion gear;
   a stepped gear unit including a larger-diameter gear having more teeth than said drive gear and meshing with said drive gear, and a smaller-diameter gear disposed concentric with said larger-diameter gear and rotating unitarily with said larger-diameter gear; and
   shifting means having a driven gear meshing with the smaller-diameter gear and a slider that is disposed facing said driven gear and axially immovably coupled to a spool shaft onto which the spool is attached, said shifting means being for reciprocating the spool by rotation of said driven gear, said driven gear having more teeth than said smaller-diameter gear.

2. The spinning reel reciprocating device as set forth in claim 1, wherein:
   the rotor has a barrel portion and a pair of rotor arms extending frontward from the barrel portion rear-endwise, and the reel unit has a tubular portion extending interiorly into the barrel portion; and
   the stepped gear unit is disposed interiorly in the tubular portion.

3. The spinning reel reciprocating device as set forth in claim 1, wherein:
   said driven gear includes a cam pin protruding from a lateral face of said driven gear; and
   said slider is fitted reciprocatingly to the reel unit and has a cam groove on a lateral face of said slider that opposes said driven gear such that said cam pin engages said cam groove, said cam groove extending in a direction that intersects with a direction in which the spool moves.

4. The spinning reel reciprocating device as set forth in claim 3, wherein
   a length of said cam groove is greater than a diameter of a circle along which said cam pin pivots.

5. The spinning reel reciprocating device as set forth in claim 1, wherein
   said stepped gear unit and said driven gear are both supported by the reel unit.

6. The spinning reel reciprocating device as set forth in claim 1, wherein
   said smaller-diameter gear is disposed closer to said slider relative to said larger-diameter gear.

7. The spinning reel reciprocating device as set forth in claim 1, wherein
   said drive gear is provided on a main gear shaft that is mounted rotatively in the reel unit so as to rotate unitarily with the handle; and
   the spool shaft, which is axially movably mounted in the reel unit and forward-endwise onto which the spool is attached, is fitted axially immovable to said slider.

8. A spinning reel, comprising
   a reel unit having a reciprocating mechanism therein;
   a rotor rotatively supported at a front portion of said reel unit;
   a handle rotatively supported by said reel unit, the rotation of said handle being transmitted to said rotor via a pinion gear; and a spool disposed on a front portion of said rotor so as to be shiftable in a front-back direction through said reciprocating mechanism, said reciprocating mechanism including a main gear for rotating together with the rotation of said handle;

a drive gear for rotating in cooperation with rotation of said handle, said drive gear being disposed on an opposite side from said main gear relative to said pinion gear;

a stepped gear unit including a larger-diameter gear having more teeth than said drive gear and meshing with said drive gear, and a smaller-diameter gear disposed concentric with said larger-diameter gear and rotating unitarily with said larger-diameter gear; and shifting means having a driven gear meshing with said smaller-diameter gear and a slider that is disposed facing said driven gear and axially immovably coupled to a spool shaft, said shifting means being for reciprocating said spool by rotation of said driven gear, said driven gear having more teeth than said smaller-diameter gear.

9. The spinning reel as set forth in claim 8, wherein:

said driven gear includes a cam pin protruding from a lateral face of said driven gear; and said slider is fitted reciprocatingly to said reel unit and has a cam groove on a lateral face of said slider that opposes said driven gear such that said cam pin engages said cam groove, said cam groove extending in a direction that intersects with a direction in which said spool moves.

10. The spinning reel reciprocating device as set forth in claim 9, wherein a length of said cam groove is greater than a diameter of a circle along which said cam pin pivots.

11. The spinning reel as set forth in claim 8, wherein said stepped gear unit and said driven gear are both supported by said reel unit.

12. The spinning reel as set forth in claim 8, wherein said smaller-diameter gear is disposed closer to said slider relative to said larger-diameter gear.

13. The spinning reel as set forth in claim 8, wherein said reel unit has a reel body having an opening on its side, and a lid member for closing said opening, and a handle shaft about which said handle rotates is supported by both said reel body and said lid member.

14. The spinning reel as set forth in claim 13, wherein said drive gear is provided on said handle shaft that is mounted rotatively in said reel unit so as to rotate unitarily with said handle; and said spool shaft, which is axially movably mounted in said reel unit and forward-endwise onto which said spool is attached, is fitted axially immovably to said slider.

* * * * *